United States Patent [19]

Beresniewicz

[11] Patent Number: 4,564,661
[45] Date of Patent: Jan. 14, 1986

[54] TERTIARY PERFLUOROALKOXIDES AS SURFACTANTS IN PTFE DISPERSION POLYMERIZATION

[75] Inventor: Aleksander Beresniewicz, Wilmington, Del.

[73] Assignee: E. I. Du Pont de Nemours and Company, Wilmington, Del.

[21] Appl. No.: 711,055

[22] Filed: Mar. 12, 1985

[51] Int. Cl.⁴ ............................................. C08F 2/24
[52] U.S. Cl. ................................. 526/212; 524/758; 524/767
[58] Field of Search ............ 526/212, 214, 217, 220; 524/714, 767, 773, 758

[56] References Cited

U.S. PATENT DOCUMENTS

| | | | |
|---|---|---|---|
| 2,559,629 | 7/1951 | Berry | 260/408 |
| 2,559,752 | 7/1951 | Berry | 260/29.6 |
| 3,391,099 | 7/1968 | Punderson | 260/29.6 |
| 3,704,285 | 11/1972 | Porter | 260/87.5 A |
| 4,025,709 | 5/1977 | Blaise et al. | 526/225 |
| 4,380,618 | 4/1983 | Khan et al. | 526/206 |
| 4,384,092 | 5/1983 | Blaise et al. | 526/225 |
| 4,482,685 | 11/1984 | Chin | 526/220 |

*Primary Examiner*—Paul R. Michl

[57] ABSTRACT

An improvement is disclosed in a process for conducting PTFE dispersion polymerization, comprising use of tertiary perfluoroalkoxy compounds as surfactants.

11 Claims, No Drawings

4,564,661

TERTIARY PERFLUOROALKOXIDES AS SURFACTANTS IN PTFE DISPERSION POLYMERIZATION

BACKGROUND OF THE INVENTION

The present invention relates generally to PTFE dispersion polymerization techniques, and particularly to a new class of surfactants for use in PTFE dispersion polymerization.

Polytetrafluoroethylene homopolymer (PTFE) and copolymers of tetrafluoroethylene (TFE) and ethylenically unsaturated comonomers can be produced in aqueous media by two distinctly different procedures. In one procedure, little or no dispersing additives, or surfactants, are added, and vigorous agitation is provided, yielding a precipitated resin, usually referred to as "granular resin." In the second procedure, a dispersing additive or surfactant is added, and mild agitation provided, to yield a uniform suspension of small polymer particulates. The products of the two processes are employed in different applications; granular resin is fabricated into products by molding, while the resin produced by dispersion polymerization is employed in dispersion coating and paste extrusion fabrication processes.

Numerous classes of suitable surfactants for PTFE dispersion polymerization have been proposed and evaluated. Included within these classes are polyfluoroalkanoic acids and salts thereof; polyfluorosulfonic acids and salts thereof; polyfluorophosphonic acids and salts thereof; sulfuric and phosphoric acid esters of polyfluoroalkanols; and polyfluoroalkylamine salts. These classes and other suitable dispersing agents are disclosed by Berry, U.S. Pat. No. 2,559,752, among others. Other useful general references relating to PTFE dispersion polymerization processes include Punderson, U.S. Pat. No. 3,391,099; Porter, U.S. Pat. No. 3,704,285; Gangal, U.S. Pat. No. 4,186,121; and Khan, U.S. Pat. No. 4,380,681.

Of the foregoing classes of surfactants, the most widely employed are sodium and ammonium salts of a perfluoromonocarboxylic acid having 6 to 10 carbons, especially ammonium perfluorooctanoate.

The foregoing classes of surfactants can be structurally characterized as bifunctional compounds having regions of different polarity; specifically, each surfactant molecule comprises a hydrophobic group and a hydrophilic group. In dispersion polymerization processes, the hydrophobic group is adsorbed onto the surface of a growing particle, while the hydrophilic group remains in the aqueous phase. The hydrophilic group is hydrated in the aqueous medium and in the case of ionic surfactants, it is also ionized, imparting a charge to the particle surface. As a result of their like-charged surfaces, individual particles repel each other, preventing coagulation. This combination of properties in a surfactant improves dispersion stability and favors efficient polymerization.

Alkoxides have not been previously proposed as potential surfactants, since these compounds are readily hydrolyzed by water in an equilibrium reaction, for example:

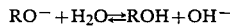

$$RO^- + H_2O \rightleftharpoons ROH + OH^-$$

However, in the case of tertiary perfluoroalkoxides, the equilibrium favors the alkoxide, enabling use of such compounds as surfactants. Moreover, it has now been found that use of tertiary perfluoroalkoxides as surfactants provides unexpected increases in polymerization rates. Heretofore, increases in polymerization rates, and hence process productivity, could be obtained only by increasing concentrations of polymerization initiator. However, this expedient provides polymer having reduced average molecular weight. Use of tertiary perfluoroalkoxides as surfactants provides significantly increased polymerization rates without adversely affecting the size of polymer chains or the morphology of the resulting dispersed polymer particles.

SUMMARY OF THE INVENTION

The present invention provides an improvement in a process for producing a colloidal dispersion of polytetrafluoroethylene homopolymer or copolymers of tetrafluoroethylene and ethylenically unsaturated comonomers by polymerizing tetrafluoroethylene and, optionally, ethylenically unsaturated comonomers, in an aqueous medium in the presence of an ionic initiator and a surfactant, the improvement comprising use as surfactant of a compound of the formula

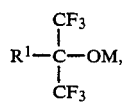

$$R^1-\underset{\underset{CF_3}{|}}{\overset{\overset{CF_3}{|}}{C}}-OM,$$

wherein
$R^1$ is $(C_nF_{2n+1})$ or $CF_3O(CF_2O)_mCF_2$;
M is a monovalent cation;
n is an integer from 6 to 12; and
m is an integer from 3 to 10.

DETAILED DESCRIPTION OF THE INVENTION

Processes for dispersion polymerization of TFE, alone or in combination with other polymerizable ethylenically unsaturated comonomers, in aqueous media to provide colloidal particles of PFTE homopolymer and copolymers, are well known in the art. As used throughout the specification, "TFE dispersion polymerization" refers to both polymerization of TFE alone, and in combination with various suitable comonomers. Exemplary suitable comonomers include perfluoro (terminally unsaturated olefins) of 3 to 7 carbon atoms such as hexafluoropropylene, and perfluoro (alkyl vinyl ethers) of 3 to 7 carbon atoms such as perfluoro(n-propyl vinyl ether). Generally, TFE monomer, along with comonomer if desired, is admixed or contacted with an aqueous dispersion containing a polymerization initiator and a surfactant, also referred to as a "dispersing agent." Typically, monomer is introduced into the dispersion under pressure.

Suitable conditions for TFE dispersion polymerization include polymerization temperatures ranging from 40° C. to 120° C., preferably 60° C. to 90° C.; and polymerization pressures ranging from 20 to 600 psig TFE (138 kPa to 4140 kPa), preferably 100 to 300 psig TFE (690 kPa to 2070 kPa). Polymerizations are generally carried out in a gently stirred autoclave.

Initiators employed are known PTFE polymerization initiators, examples of which include inorganic persulfates such as ammonium persulfate, alkali metal persulfates such as potassium persulfate, and organic perfluoroperoxides such as perfluoropropionyl peroxide.

Initiator can be added prior to initiation of polymerization or added in increments throughout the process of polymerization. The amount of initiator employed depends upon the temperature of polymerization, the identity of the initiator, the molecular weight of the polymer desired, and the desired reaction rate. As previously noted, relatively greater concentrations of initiator increase reaction rates, but provide shorter polymer chains, which are not desirable in many applications. For use in the improved process of the present invention, initiator concentrations can be maintained from 0.0001 to 0.10 percent by weight. Preferably, initiator concentrations are maintained from about 0.005 to about 0.020 percent by weight of aqueous polymerization medium.

The dispersing agents employed in the improved process of the present invention are tertiary perfluoroalkoxy compounds, preferably alkali metal tertiary perfluoroalkoxides, as described by the following formula:

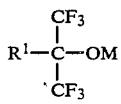

$R^1$ in the foregoing formula is $C_nF_{2n+1}$ or $CF_3O(CF_2O)_mCF_2$; M is a monovalent cation, preferably Na, Li, K, or $NH_4$; n is an integer from 6 to 12, preferably 7 to 9; and m is an integer from 3 to 10, preferably 5 to 8.

The tertiary perfluoroalkoxy surfactants provided by the present invention can be employed in aqueous media at concentrations of 0.001 to 5 percent by weight, preferably 0.2 to 1.0 percent by weight of medium. The process can be run in batch mode or in a continuous reactor.

Tertiary perfluoroalkoxides useful in TFE dispersion polymerization can be prepared from corresponding tertiary perfluoroalcohols by reaction with Na, Li, K, or ammonium hydroxides. Tertiary perfluoroalcohols can be prepared by reactions between hexafluoroacetone and suitable perfluoroalkyl Grignard reagents, similar to the procedure detailed below, which involves a halogen-metal interchange between a perfluoroalkyl halide and a common Grignard reagent.

Synthesis of sodium perfluoro(2-methyl-2-oxidodecane), which is employed as a surfactant in Examples 1-3, below, was accomplished as follows.

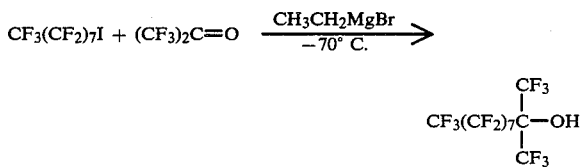

350 mL of tetrahydrofuran, freshly distilled over lithium aluminum hydride, were placed into a dry reactor fitted with an efficient vibromixer. 5.33 g (40 mmol) ethyl magnesium bromide were then injected, under $N_2$, into the reactor, which was cooled to $-70°$ C. While maintaining vigorous stirring, 22 g (40 mmol) $CF_3(CF_2)_7I$ were injected at a rate which maintained the temperature of the reaction mixture below $-60°$ C. At this point, approximately 11.6 g (70 mmol) hexafluoroacetone were introduced into the reaction mixture, which was kept under $N_2$ at $-70°$ C. for 2 hours, and then allowed to warm to about 23° C. A clear solution resulted. This solution was poured into a saturated NaCl solution containing about 0.15M HCl. The resulting organic fraction was separated, and the remaining aqueous layer was extracted once with ether. The ether extract was combined with the organic fraction previously isolated, and the resulting combined organic layers were washed again with a saturated NaCl solution, dried, and evaporated on a rotary evaporator at about 30° C. During this process, the organic fraction became brown, indicating the presence of free iodine. Trichlorofluoromethane (Freon® 11) was added to the organic fraction, which was then washed with a sodium thiosulfate solution until colorless, dried, and evaporated again to leave a product, which was distilled twice under reduced pressure. Two fractions were collected; 5 g (up to 70° C.) and 12 g (79°-83° C.). Analysis by GC indicated the presence of product perfluoro(2-methyl-2-decanol), $CF_3(CF_2)_7(CF_3)_2C-OH$.

The foregoing product was contacted with an equimolar amount of NaOH and KOH, forming a reaction mixture. After the reaction appeared to be complete, the mixture was warmed to about 85° C. and a stream of $N_2$ passed over the top of the solution to evaporate water from the mixture. The resulting Na and K salts of perfluoro(2-methyl-2-oxidodecane) were dried under high vacuum at about 80° C.

The following examples illustrate particular aspects of the present invention. In the examples and comparisons, all parts and percentages are by weight unless otherwise indicated, and all degrees are Celsius (°C.).

EXAMPLES 1-3 AND COMPARISONS A-C

In Examples 1-3 and Comparisons A-C, which are summarized in Table I, below, PTFE polymerizations were conducted in a sealed research reactor, with stirring at 1000 rpm, at 80°. In Examples 1-3, a tertiary perfluoroalkoxy surfactant was employed. In Comparisons A-C, a conventional PTFE polymerization surfactant, ammonium perfluorooctanoate, was employed. The results obtained, which are reported in Table I, below, indicate that dispersion polymerization surfactants in accordance with the present invention provide substantial increases in PTFE polymerization rates.

In each of Examples 1-3 and Comparisons A-C, a 12 oz. (355 mL) stirred Paar bomb was charged with 200 g deionized $H_2O$ containing a selected quantity of the surfactant to be tested and 0.0100 g potassium persulfate ($K_2S_2O_8$). The test reactor was equipped with a constant speed stirrer, thermocouple, gas inlet tube for introduction of TFE, pressure gauge, inlet for initiator and surfactant solutions, external fitting for evacuation and charging with nitrogen, and an external silicone oil bath for heating. Following charging with water and initiator, the system was evacuated for 5 to 10 minutes, using an oil vacuum pump. The reactor was then charged with nitrogen, and then the evacuation step was repeated. The reactor was then recharged with nitrogen, and a selected quantity of surfactant, prepared as a concentrated solution in deionized water, was added, together with additional water to replace any lost by evaporation. The evacuation/charging step was then repeated an additional three times, and a small amount of TFE was also bled into the reactor each time to purge the lines of any air. The foregoing procedure ensured that all oxygen was excluded from the system prior to each polymerization experiment.

Following the final evacuation, TFE was admitted to the reactor, at ambient temperature, to provide a pressure of 50 psig (345 kPa). The TFE source was then cut off, and the reactor heated to 80°. At this temperature, the internal pressure of the reactor was approximately 65 psig (448 kPa). In each experiment, a drop in TFE pressure indicated initiation of polymerization. During each experiment, TFE pressure was maintained at 60 psig (414 kPa). Instantaneous rates of polymerization were determined by interrupting the TFE supply for one minute and observing the resulting drop in pressure, which is proportional to the instantaneous polymerization rate. Average polymerization rates were determined by measuring the quantity of solids produced during an experiment and are expressed herein as grams polymer produced per liter, per hour.

Polymerization experiments were terminated when the reactor contained about 6.5 percent (plus or minus 0.5 percent) solids, by releasing TFE pressure. The contents of the reactor were then cooled to about 23°, and screened using a 400 mesh screen. Any polymer remaining on the screen or adhering to the stirrer blades was weighed separately and recorded as coagulum. Particle morphology was evaluated by scanning electron micrography.

The results of Examples 1–3 and Comparisons A–C are set forth in Table I, below. In the column indicating surfactant identity, "A" refers to the tertiary perfluoroalkoxide sodium perfluoro(2-methyl-2-oxidodecane) ($C_8F_{17}C(CF_3)_2ONa$), and "B" refers to the conventional surfactant ammonium perfluorooctanoate ($C_7F_{15}COONH_4$).

and a surfactant, the improvement comprising use as surfactant of a compound of the formula

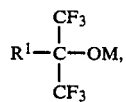

wherein
$R^1$ is ($C_nF_{2n+1}$) or $CF_3O(CF_2O)_mCF_2$;
M is a monovalent cation;
n is an integer from 6 to 12; and
m is an integer from 3 to 10.

2. A process according to claim 1, wherein the surfactant is present at a concentration of from 0.001 to 5 percent by weight of medium.

3. A process according to claim 2, wherein polymerization is conducted at a temperature from about 40° C. to about 120° C., and at a pressure from about 138 kPa to about 4140 kPa.

4. A process according to claim 3, wherein the initiator is an inorganic persulfate, present at a concentration from about 0.005 to about 0.020 percent by weight of medium.

5. A process according to claim 4, wherein the surfactant is present at a concentration from about 0.2 to about 1.0 percent by weight of medium.

6. A process according to claim 5, wherein polymerization is conducted at a temperature from about 60° C. to about 90° C., and at a pressure from about 690 kPa to about 2070 kPa.

7. A process according to claim 1, wherein M is Na, Li, K, or $NH_4$.

8. A process according to claim 7, wherein $R^1$ is $C_nF_{2n+1}$.

9. A process according to claim 8, wherein n is an integer from 7 to 9.

10. A process according to claim 9, wherein n is 8.

11. A process according to claim 10, wherein the surfactant is sodium perfluoro(2-methyl-2-oxidodecane).

TABLE I

| | | Examples 1–3 and Comparisons A–C: Evaluation of Conventional and Tertiary Perfluoroalkoxy PTFE Dispersion Polymerization Surfactants | | | | | |
|---|---|---|---|---|---|---|---|
| | Surfactant | | Polymerization Time (min) | Avg. Rate (g/hr/L) | Surface Tension (Dyne/cm$^2$) | Coagulum (g) | Particle Morphology |
| Example or Comparison | Identity | Quantity (%) | | | | | |
| 1 | A | 0.20 | 30 | 93 | 66.5 | 0.11 | spherical and rod-like |
| 2 | A | 0.50 | 37 | 117 | 65.7 | 3.04 | mostly rod-like |
| 3 | A | 1.00 | 23 | 172 | 46.8 | 0.34 | intertwined fibrils |
| A | B | 0.20 | 60 | 69 | 62.5 | 0.10 | mostly spherical |
| B | B | 0.50 | 46 | 90 | 52.2 | <0.10 | mostly spherical; some rod-like |
| C | B | 1.00 | 34 | 124 | 40.3 | 0.25 | spherical and rod-like |

What is claimed is:

1. In a process for producing a colloidal dispersion of polytetrafluoroethylene homopolymer or copolymers of tetrafluoroethylene and ethylenically unsaturated comonomers by polymerizing tetrafluoroethylene and, optionally, ethylenically unsaturated comonomers, in an aqueous medium in the presence of a suitable initiator

* * * * *